W. H. Emerson.
Dish Washer.
No. 91,529.
Patented Jun. 22, 1869.

Witnesses:
G. S. Chapin
E. E. Gibson

Inventor:
William H. Emerson

United States Patent Office.

WILLIAM H. EMERSON, OF DIXON, ILLINOIS.

Letters Patent No. 91,529, dated June 22, 1869.

IMPROVED DISH-WASHER.

The Schedule referred to in these Letters Patent and making part of the same.

*To all whom it may concern:*

Be it known that I, WILLIAM H. EMERSON, of Dixon, in the county of Lee, and State of Illinois, have invented a new and improved Machine for Washing Dishes; and I do hereby declare that the following is a full, clear, and exact description thereof, reference being had to the accompanying drawings, and letters marked thereon, making a part of this description, in which—

Figure 1:
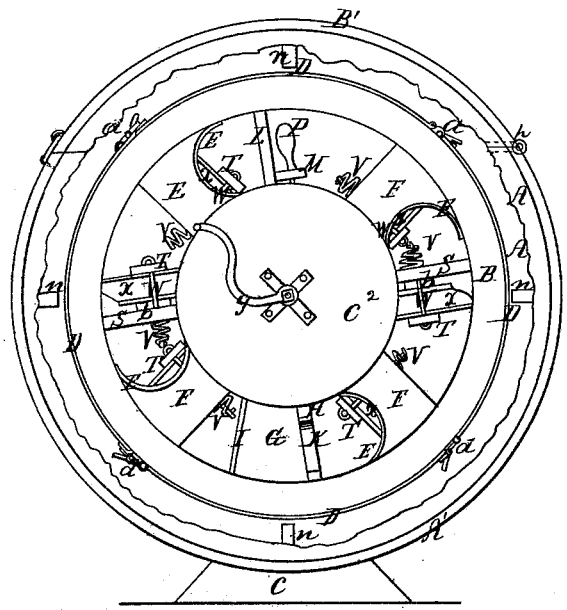

Figure 1 is an end elevation of my invention, with one end of the case broken away to give a view of the interior part.

Figure 2:
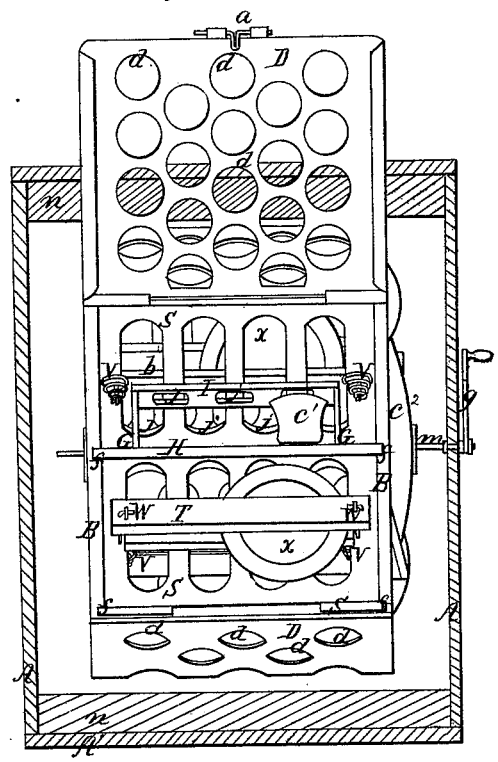

Figure 2, a horizontal section of the case, and a top view of the rotating cylinder, with the dish-holders and dishes in position, as when the latter are being washed.

Figure 3:
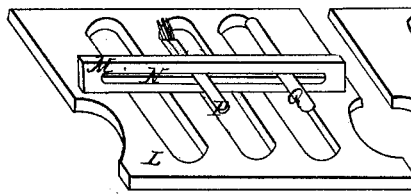

Figure 3, a perspective view of the knife and fork-holder removed from the rotating cylinder.

Figure 4:
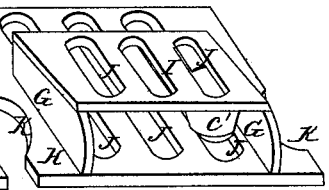

Figure 4, a perspective view of one of the dish-holders, also removed.

Figure 5:

Figure 5, a perspective view of one of the buckets for conducting a current of water into the interior of the cylinder.

The present invention relates to an improved machine, which is conveniently arranged to hold ordinary table-ware, and also to wash and dry the same very speedily, and at the same time without liability of breakage; and Its nature consists principally of a series of removable holders, which are so constructed as to receive dishes, knives, &c., of various forms and sizes, and hold them securely when being washed, and which are held in radial grooves made in slotted cylindrical ends, by means of a series of perforated doors, which form the periphery of the cylinder, the latter operating in a suitable case or drum, and the several parts having a detailed description as follows:

A A' represent a cylindrical case, which is supported on a stand, C, and provided with a lid, B', for the convenience of access to a cylinder, B, placed inside said case, holding dish-water, and having a series of ribs, n, attached to the inside of its periphery, for agitating the water as the cylinder B rotates.

G K I, figs. 1, 2, and 4, represent a removable dish-holder, which is placed in radial grooves f, formed in the ends B of the rotating cylinder, and its parts, H I, are placed such a distance apart as is most convenient to receive between them a tier of dishes, $C^1$, and they are so cut away, or slotted out at J J, &c., as freely to allow currents of water to pass through and come in contact with all parts of the dish or dishes, the ends of the part H, at K, being also cut away for the same purpose.

M L represent the removable knife and fork-holder, the part L of which is formed in the same manner as the part H at fig. 4; the rack or clamp M, however, consisting of a narrow strip fastened to the part L, and having a suitable slot, N, to receive the knives, forks, spoons, &c.

S S, &c., figs. 1 and 2, represent a series of removable slides, which are also formed with a series of slots through them, similar to the parts L H, figs. 3 and 4, for the passage of water, and which are provided with clamps b T, so held in place by rods W and springs V, that dishes of different sizes may be put between them, and retained with such force as to prevent breakage during the process of washing.

The ends of the rotating cylinder are formed with rims B, radial arms F, and circular centre-pieces, $C^2$, leaving openings between the arms for water freely to pass into the interior. And one end of the cylinder is provided with buckets E, which conduct currents of water on to the dish-holders, and to the opposite end of the cylinder. The dish-holders are held in the grooves f by two or more hinged doors D, figs. 1 and 2, which may be opened for the convenience of getting access to the interior.

Operation.

The case A should be filled about one-third full of dish-water, after which the dishes can be put in the holders, as shown in fig. 2, or the dishes can be put in first, if desired.

The cylinder is now to be rotated on its shaft m, by means of the shaft g.

The drying is done by drawing off the dish-water, rinsing the dishes with hot water, and allowing them to stand while the door B' of the case is open.

Having thus described my invention,

What I claim, and desire to secure by Letters Patent of the United States, is—

1. The rotating cylinder B F $C^2$, provided with doors D, in combination with removable dish-holders L M G H I, and S b T, as set forth.

2. The combination of the cylinder B F $C^2$, carrying the dish-holders, with the case A, as and for the purpose described.

3. In combination with the cylinder B F C, the buckets E, for conducting currents of water on to the dishes in the holders, as described.

WILLIAM H. EMERSON.

Witnesses:
G. L. CHAPIN,
E. E. GIBSON.